United States Patent [19]
Woolcock et al.

[11] 3,760,092

[45] Sept. 18, 1973

[54] SUPERCONDUCTING COMPOSITE

[75] Inventors: Alan Woolcock; Ian Leitch McDougall, both of Staffordshire; Anthony Clifford Barber, Warwickshire, all of England

[73] Assignee: Imperial Metal Industries (Kynoch) Limited, Witton Birmingham, England

[22] Filed: June 20, 1972

[21] Appl. No.: 264,453

Related U.S. Application Data

[62] Division of Ser. No. 67,740, Aug. 28, 1970, Pat. No. 3,686,750.

[30] Foreign Application Priority Data

Sept. 2, 1969 Great Britain .................43,330/69

[52] U.S. Cl...... 174/126 CS, 174/DIG. 6, 174/15 C, 174/126 CP, 174/128

[51] Int. Cl.............................................. H01v 11/08

[58] Field of Search.................. 174/DIG. 6, 126 R, 174/126 CP, 126 CS, 128, 15 C, 115; 335/216

[56] References Cited

UNITED STATES PATENTS

| | | | |
|---|---|---|---|
| 288,443 | 11/1883 | Johnson | 174/128 |
| 3,332,047 | 7/1967 | Borchert | 174/126 R |
| 3,470,508 | 9/1969 | Donadieu | 174/DIG. 6 |
| 3,472,944 | 10/1969 | Morton | 174/126 R |
| 3,474,187 | 10/1969 | Donadieu | 174/128 |

*Primary Examiner*—E. A. Goldberg

*Attorney*—John W. Malley et al.

[57] ABSTRACT

A rod conductor of normal material has superconductive filaments located in grooves extending in a helical path on the periphery of the rod. The mouths of the grooves are closed and the composite is a superconductor.

7 Claims, 6 Drawing Figures

SUPERCONDUCTING COMPOSITE

BACKGROUND OF THE INVENTION

This is a division of application Ser. No. 67,740 filed Aug. 28, 1970 now U.S. Pat. No. 3,686,750 issued Aug. 29, 1972.

This invention relates to electrical conductors and is particularly concerned with a method of manufacturing a composite electrical superconductor, and such a superconductor composite, in which there are provided a plurality of longitudinally-extending filaments of a superconductor material embedded in and in thermal and electrical contact with a ductile normal material. In this specification, "ductile normal material" means a ductile material which is not superconducting at the temperature of the boiling point of liquid helium, i.e., about 4.2°K.

It is an object of the invention to provide an improved superconductor composite, and method of manufacture thereof, in which the manufacturing technique is simplified compared to those previously employed, but which produces a satisfactory superconductor composite.

SUMMARY OF THE INVENTION

In accordance with the invention, a method of manufacturing a superconductor composite comprises taking a rod of a ductile normal material of which the periphery is provided with a plurality of longitudinally-extending grooves penetrating part-way towards the longitudinal axis of the rod, locating within at least one of said grooves at least one superconductor filament extending along the length of said groove, and closing the mouths of said grooves.

The invention also consists in a superconductor composite manufactured in accordance with the method just defined.

Preferably all of said grooves are provided with corresponding superconductor filaments.

Preferably further each superconductor filament is provided in a group of such filaments which are held together and embedded in a wire of ductile normal material; said composite wire is inserted in the corresponding groove in order to enter the superconductor filaments therein.

If required, some of said grooves can be provided with a reinforcing wire of a material having a greater specific strength than that of said ductile normal material; the or each reinforcing wire can be a strong copper-beryllium alloy, stainless steel, cupro-nickel, or titanium as examples, particularly if the ductile normal material is copper or aluminium.

Along the longitudinal axis of the rod, there may be provided a hollow whereby said rod is tubular; in this way use of the superconductor composite in a cooling medium of liquid helium can be facilitated by the supply of the liquid helium to the hollow interior of the rod as a supplement to or in replacement for cooling the exterior of the rod.

Alternatively, there can be provided along the longitudinal axis of the rod one of said reinforcing wires either alone or as the centre of an array thereof.

BRIEF DESCRIPTION OF THE DRAWINGS

Typical examples of the invention will now be described with reference to the accompanying diagrammatic drawings in which.

DESCRIPTION OF THE PREFERRED EXAMPLES

Figure 1:
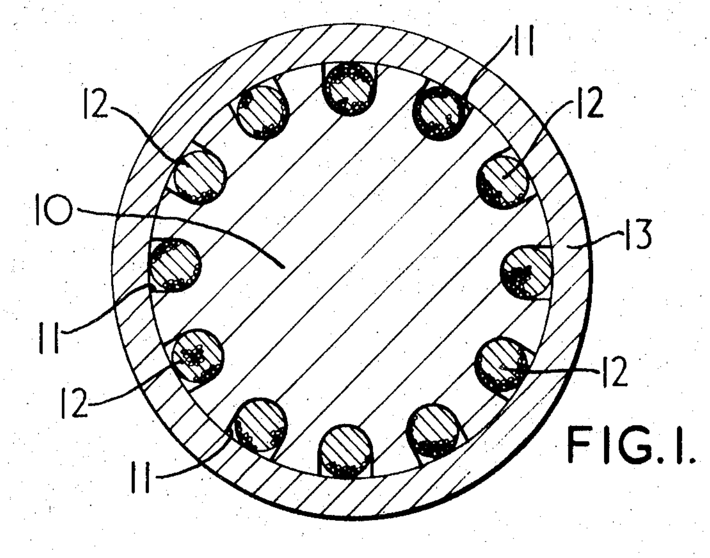
FIG. 1 is a cross-sectional view of a first example of a composite superconductor.
Figure 2:
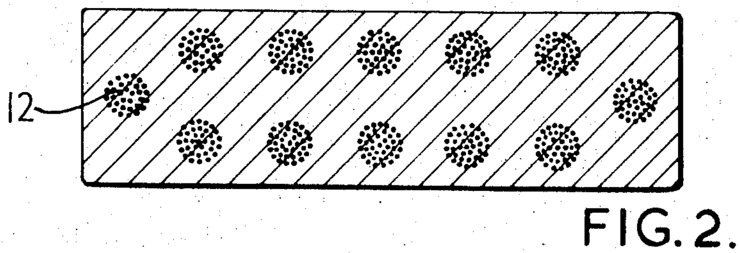
FIG. 2 is a cross-sectional view of the composite of FIG. 1 in a later stage of manufacture.

Referring initially to FIGS. 1 and 2, there is shown therein a first example of a composite superconductor in which a rod 10 of a ductile normal material, typically high conductivity copper, is provided around its periphery with twelve equally spaced grooves 11 of which each lies along a corresponding radius from the centre of the rod 10, and along the length of the rod 10 parallel to its axis.

There is provided in each of the grooves 11 a corresponding composite wire 12 consisting of a copper or other ductile normal material wire having a diameter approximately equal to the width of the groove 11, and containing and in good electrical and thermal contact with, a number of filaments of a ductile superconductor material. The superconductor material of this example is the alloy niobium 44wt.% titanium. Each wire 12 can contain any desirable number of superconductor filaments, and may be manufactured, for example by the methods described and claimed in our British Pat. No. 1178115.

The wires 12 are held in their corresponding grooves 11 by the provision of a copper or other ductile normal material sheath 13 which surrounds the periphery of the rod 10 and closes the grooves 11, thereby trapping the wires 12 between the walls of the grooves and the inner surface of the sheath 13.

The assembly thus formed can be compacted and elongated, for example by being swaged, then rolled and then drawn. If desired, the final configuration of the assembly can be that shown in FIG. 2 of the drawings.

Figure 3:
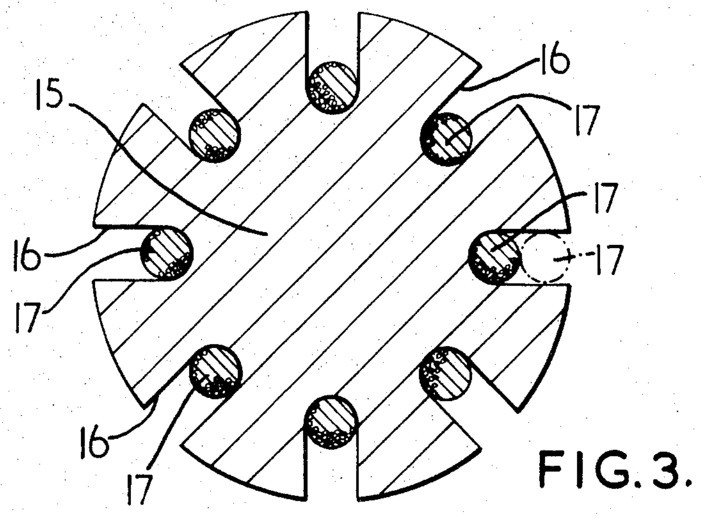
FIG. 3 is a cross-sectional view of a second example of a composite superconductor.
Figure 4:
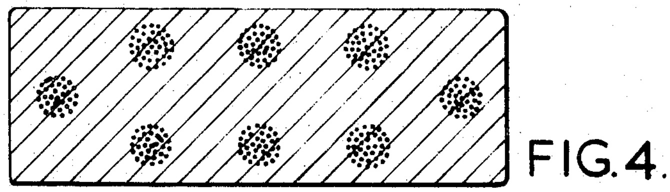
FIG. 4 is a cross-sectional view of the composite of FIG. 3 in a later stage of manufacture.

Referring now to FIGS. 3 and 4 of the drawings, in a second example of the present invention, a rod 15 of copper is provided with eight equally spaced grooves 16 each lying in a corresponding radial plane from the longitudinal axis of the rod 15, and each extending along the rod parallel to that axis. Each groove 16 is of a depth approximately equal to twice its width.

There are provided in each groove 16 either one or two composite wires 17 which are similar to the composite wires 12 described in relation to the first example of the invention, each wire 17 having a diameter approximately equal to the width of the corresponding groove 16. If two composite wires 17 are provided in each groove 16, that groove will be almost filled, but if only one composite wire 17 is required for each groove 16, there can be used a packing wire which is of the same physical dimensions as the composite wires 17, is made of copper, but does not contain any superconductor filaments.

The assembly thus formed is swaged, rolled and drawn to close the grooves 16 against the composite wires 17, and to elongate the assembly. If required, the final physical configuration of the assembly can be that illustrated in FIG. 4.

Figure 5:
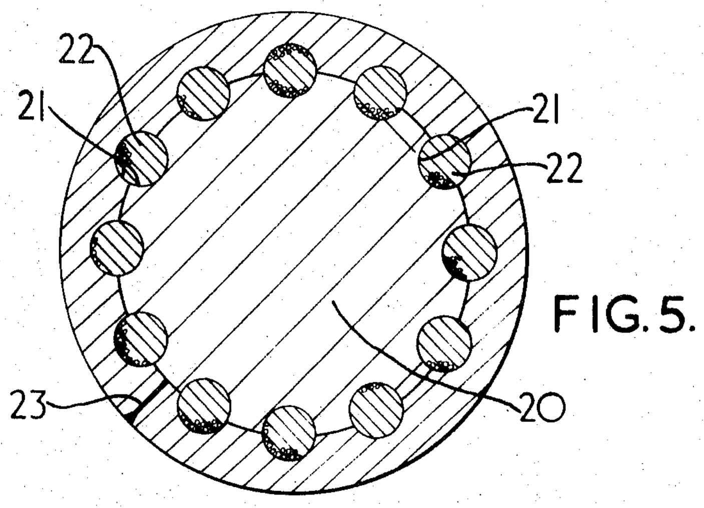
FIG. 5 is a cross-sectional view of a third example of a composite superconductor.

Referring now to FIG. 5 of the drawings, this shows a third example of the invention in which there is provided a copper rod 20 around the outer periphery of which are provided twelve equally spaced longitudinally-extending grooves 21 of which each has a depth approximately equal to one half of its width.

There is provided in each groove 21 a corresponding composite wire 22 similar to the wires 12 and 17 respectively of the first and second examples of the invention, each composite wire 22 having a diameter approximately equal to the width of its grooves. Consequently each wire 22 projects above its grooves 21.

To close the grooves 21 and trap the wires 22 in the grooves, there is wrapped around the rod 20 a sheet of aluminium which is pressed tightly against the outer surfaces of the wires 22 and the periphery of the rod 20, and of which the facing edges are welded together at 23.

The assembly so formed is compacted by being swaged and drawn and can be rolled to a desired configuration.

Figure 6:
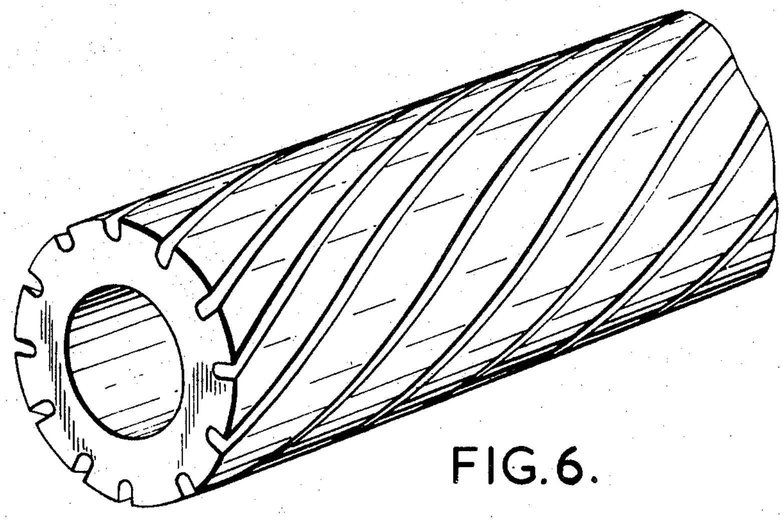
FIG. 6 is a perspective view of a component of a modified example.

Referring now to FIG. 6 of the drawings, this illustrates a modification which can be applied to any of the three examples described above in that the grooves 11, 16 and 21 respectively of the three examples can be provided in a helical configuration so that each groove extends along the length of its rod in a helical path. This can provide advantages as regards the superconducting stability of the eventual composite and in handling the composite during manufacture. FIG. 6 also illustrates a further modification of the invention in that each of the rods 10,15,20 respectively of the three examples described above can be provided with a central hollow so as to be tubular. The hollow can be used for the passage of liquid helium or can eventually be filled by the insertion of a reinforcing wire.

In a further modification the grooves can be provided at an angle to the corresponding radius from the longitudinal axis of the rod to the mid-point of the mouth of the groove. In this case, the grooves are preferably closed by swaging the rod; as an alternative, the grooves can be closed by a drawing process. All such swaging and drawing can be carried out either at room temperature or at an elevated temperature of up to 800°C.

In order to improve the finish of the external surface of the rod, or to assist in closing the grooves, either before or after closure of the grooves the rod can be inserted in a preformed tube of a ductile normal material or a tube can be produced in situ by wrapping the rod in a strip of the ductile normal material, followed by seam-welding the facing edges of the strip, as described in the third example. The assembly so produced can then be rod-rolled or drawn as required.

In a modification of the methods hereinbefore described, the rod may be manufactured by taking a strip of a ductile normal material into one face of which are formed the grooves, and curving the strip across its width to bring its edges together. The edges are then welded together. The interior so produced can be left empty, whereby a tube is produced, or a tube or solid rod of the same or another ductile normal material may be provided as a mandrel for the strip, and left in position within the welded strip. This tube or solid rod can be of reinforcing material, for example of stainless steel.

If the wire inserted in its corresponding groove contains more than one superconductor filament, it is preferably twisted before such insertion in order to reduce magnetic coupling between different lengths of superconductor material.

It is to be noted that when each wire consists of a matrix of ductile normal material containing a plurality of superconductor filaments, the ductile normal material in the wire and the rod will always act as an emergency shunt in the event of breakdown of the superconductivity of the superconductor filaments. The ductile normal material will also act to provide mechanical strength and to separate the filaments from one another and to remove heat when cooled. If the filaments are intrinsically stable by virtue of their diameter and twisting, as described in co-pending British Pat. application No. 16023/68 (Ser. No. 812,015), the ductile normal material will have no other thermal or electrical effect. If the superconductor filaments are not intrinsically stable, the normal material will also act as a stabiliser for the superconductor material, conducting away and absorbing any heat generated in the superconductor material by flux jumps.

We claim:

1. A superconductor composite comprising a rod of ductile normal material, the periphery of which having a plurality of grooves extending in a longitudinal direction along a helical path penetrating part-way towards the axis of the rod, each groove containing at least one superconducting filament extending the length of the groove, the mouths of the grooves being closed.

2. A superconductor composite as claimed in claim 1 wherein the rod is hollow.

3. A superconductor composite as claimed in claim 1 in which each superconductor filament is provided in a group of such filaments which are held together and embedded in a wire of normal material, and said wire is inserted in the corresponding groove in order to enter the superconductor filaments therein.

4. A superconductor composite as claimed in claim 1 wherein some at least of said grooves are provided with a corresponding reinforcing wire of a material having a greater specific strength than that of said ductile normal material.

5. A superconductor composite as claimed in claim 2 wherein said hollow contains a reinforcing wire of a material of a greater specific strength than that of said ductile normal material.

6. A superconductor composite as claimed in claim 4 wherein said material having a greater specific strength than that of said ductile normal material is selected from the group consisting of copper-beryllium alloys, stainless steel, cupro-nickel and titanium.

7. A superconductor composite as claimed in claim 5 wherein said material having a greater specific strength than that of said ductile normal material is selected from the group consisting of copper-beryllium alloys, stainless steel, cupro-nickel and titanium.

* * * * *